(12) United States Patent
Hiro

(10) Patent No.: US 8,274,711 B2
(45) Date of Patent: Sep. 25, 2012

(54) DOCUMENT READING APPARATUS CAPABLE OF SEQUENTIALLY READING DOCUMENTS STACKED ON AN AUTOMATIC DOCUMENT FEEDER AND A DOCUMENT SET ON A PLATEN

(75) Inventor: Hideyuki Hiro, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 834 days.

(21) Appl. No.: 12/389,709

(22) Filed: Feb. 20, 2009

(65) Prior Publication Data

US 2009/0237718 A1 Sep. 24, 2009

(30) Foreign Application Priority Data

Mar. 19, 2008 (JP) ................................. 2008-071329

(51) Int. Cl.
*H04N 1/40* (2006.01)
*H04N 1/04* (2006.01)
*G03B 27/00* (2006.01)

(52) U.S. Cl. ........ 358/474; 358/449; 358/488; 358/498; 355/407; 355/408

(58) Field of Classification Search .................. 358/474, 358/1.15, 498, 488, 449, 448, 496, 497; 355/55, 355/311, 407, 408, 23, 25, 45, 48, 50, 67, 355/81, 82, 84
See application file for complete search history.

(56) References Cited

U.S. PATENT DOCUMENTS

| | | | | |
|---|---|---|---|---|
| 5,006,904 A | * | 4/1991 | Matsuo et al. | ................. 399/86 |
| 5,053,831 A | * | 10/1991 | Ishiguro et al. | ............... 399/370 |
| 5,220,394 A | * | 6/1993 | Kato et al. | ....................... 399/82 |
| 6,034,792 A | * | 3/2000 | Nakazato et al. | ............. 358/497 |
| 7,167,283 B2 | | 1/2007 | Ogino | |
| 2002/0051241 A1 | | 5/2002 | Ogino | |

FOREIGN PATENT DOCUMENTS

| | | |
|---|---|---|
| JP | 04-122170 | 4/1992 |
| JP | 05-236192 | 9/1993 |
| JP | 11-284811 | 10/1999 |
| JP | 2001-197260 | 7/2001 |

(Continued)

OTHER PUBLICATIONS

Kazuhiro, Image Reader, Oct. 15, 1999, Machine Translation Japanese Patent Application Publication, JP11284811, all pages.*

(Continued)

*Primary Examiner* — Benny Q Tieu
*Assistant Examiner* — Ngon Nguyen
(74) *Attorney, Agent, or Firm* — David G. Conlin; Steven M. Jensen; Edwards Wildman Palmer LLP

(57) ABSTRACT

When reading of the documents set on the document feed tray is given priority by user designation, the documents set on the document feed tray are read first, then the document set on the platen plate is read. When reading of the document set on the platen plate is given priority, the document set on the platen plate is read first, then the documents set on the document feed tray are read. Even when originals are composed of documents that can be set on the document feed tray and an original that cannot be set on the document feed tray, use of the above configuration makes it possible to achieve copying of the originals as one job.

12 Claims, 16 Drawing Sheets

FOREIGN PATENT DOCUMENTS

| | | |
|---|---|---|
| JP | 2001-285588 | 10/2001 |
| JP | 2002-223338 | 8/2002 |
| JP | 2004-134899 | 4/2004 |
| JP | 2005-165182 | 6/2005 |

OTHER PUBLICATIONS

Noburu, Original Reader, Jul. 19, 2001, Machine Translation Japanese Patent Application Publication, JP2001197260, all pages.*

* cited by examiner

DOCUMENT READING APPARATUS CAPABLE OF SEQUENTIALLY READING DOCUMENTS STACKED ON AN AUTOMATIC DOCUMENT FEEDER AND A DOCUMENT SET ON A PLATEN

This Nonprovisional application claims priority under 35 U.S.C. §119(a) on Patent Application No. 2008-71329 filed in Japan on 19 Mar. 2008, the entire contents of which are hereby incorporated by reference.

BACKGROUND OF THE INVENTION (1) Field of the Invention

The present invention relates to a document reading apparatus capable of sequentially reading documents stacked on an automatic document feeder and a document set on a platen as well as relating to an image forming apparatus including this document reading apparatus. This document reading apparatus is suitably applied to a scanner device, copier, facsimile machine or a multi-functional machine having the functions of these in combination.

(2) Description of the Prior Art

The document reading apparatus provided for a scanner, copier, facsimile machine or the like has an automatic reading function of reading stacked documents one page at a time with an automatic document feeder (which will be referred to hereinbelow as "ADF") and a flat bed scanner (which will be referred to hereinbelow as "FBS") function of reading each document which is manually set and pressed on the platen.

The image reading apparatus disclosed in patent document 1 (Japanese Patent Application Laid-open 2005-165182), in order to prevent a document from being left behind after read when document reading is performed in the FBS mode, includes a device for detecting the document left and reminding the operator to take it back. Specifically, a document is set on the platen for the FBS mode and pressed thereon by closing a document pressing plate member, then the reading operation by a scanner is performed. A sensor is arranged near the hinge of the pressing plate member while sensors for detecting the document size are disposed at predetermined positions in the platen. Information from these sensors is transmitted to the controller so that the controller can output a warning when a forgotten document is detected based on the pressing plate opening and closing signal and the reading operation complete signal.

However, patent document 1 merely demonstrates that the apparatus described therein is configured to give warning when document reading is going to be performed through the ADF even though a document is left on the flat bed scanner. That is, there is no reference to reading of documents through the ADF when a document has been set on the flat bed scanner.

Further, in a case where OHP sheets, postcards or other special documents are wanted to be copied as one file (job) including other documents, the OHP sheets, postcards and other special documents are not allowed to be conveyed by the ADF, hence these special documents need to be copied by being set on the platen. Hence it was impossible to handle these special documents as one file with the documents that can be processed through the ADF. Therefore, when documents to be copied through the ADF and documents to be copied through the platen are mixed up together, the operator has to change the documents from those handled by the ADF to those read through the platen and vice versa. Moreover, when multiple sets of copies need be made on a copier with no mechanical sorter, it is still necessary to manually rearrange the resultant copies even if the order of copying the ADF documents and platen documents is adjusted.

SUMMARY OF THE INVENTION

In view of the above circumstances, it is therefore an object of the present invention to provide a document reading apparatus that is capable of reading documents sequentially even when documents are set on both the document feed tray of its automatic document feeder and the platen for reading a set document as well as providing an image forming apparatus using this document reading apparatus.

In accordance with the first aspect of the present invention, a document reading apparatus includes: an automatic document feeder for automatically conveying read documents; a first document table for holding documents to be delivered to the automatic document feeder; a first document detector for detecting a document set on the first document table; a second document table on which a document is set so as to be read; a second document detector for detecting a document set on the second document table; and, a document reader for reading documents, and is characterized in that when existence of documents on the first and second document tables is detected from both the first and second document detectors, the documents set on the first and second document tables are permitted to be read.

The second aspect of the present invention is characterized in that, in addition to the above first configuration, when the fact that a document is set extending beyond the second document table is detected by the second document detector, the automatic document feeder is prohibited from operating.

The third aspect of the present invention is characterized in that, in addition to the above first configuration, which of the documents set on the first and second document tables is read first is selectable.

The fourth aspect of the present invention is characterized in that, in addition to the above first configuration, reading of the document on the second document table is started after completion of reading by the automatic document feeder.

The fifth aspect of the present invention is characterized in that, in addition to the above first configuration, after reading a designated number of pages through the automatic document feeder, the document on the second document table is read, then after completion of this reading, reading of documents through the automatic document feeder is restarted.

The sixth aspect of the present invention is characterized in that, in addition to the above first configuration, reading of documents through the automatic document feeder is started after completion of reading of the document on the second document table.

The seventh aspect of the present invention is characterized in that, in addition to any one of the above first to fourth configurations, the image read from the document on the second document table can be inserted in a designated page of the images that have been read through the automatic document feeder.

The eighth aspect of the present invention is characterized in that, in addition to any one of the above first to seventh configurations, when documents exist on both the first and second document tables, the documents are read through both the two document tables so as to create a single file of data from the read plural sets of document image data.

The ninth aspect of the present invention is characterized in that, in addition to any one of the above first to eighth configurations, the conditions for reading the documents in the first and second document tables can be designated separately.

The tenth aspect of the present invention is characterized in that, in addition to the above ninth configuration, the reading conditions include at least one of color/monochrome mode, one-side/duplex mode, resolution and enlargement/reduction.

The eleventh aspect of the present invention is characterized in that, in addition to any one of the above first to eighth configurations, the first document detector and the second document detector are used to detect the sizes of the documents set on the first and second document tables.

The twelfth aspect of the present invention resides in an image forming apparatus including a document reading apparatus according to any one of the first to eleventh aspects.

According to the present invention, when documents exist on both the first and second document tables, the documents set on the first and second document tables are scanned sequentially by the document readers. Accordingly, it is possible to perform document reading of documents that can be set on the automatic document feeder and a document that cannot be set on the automatic document feeder, as a single job, hence improve user convenience.

DESCRIPTION OF THE PREFERRED EMBODIMENTS

The embodiment of the present invention will hereinafter be described with reference to the accompanying drawings.

Figure 1:
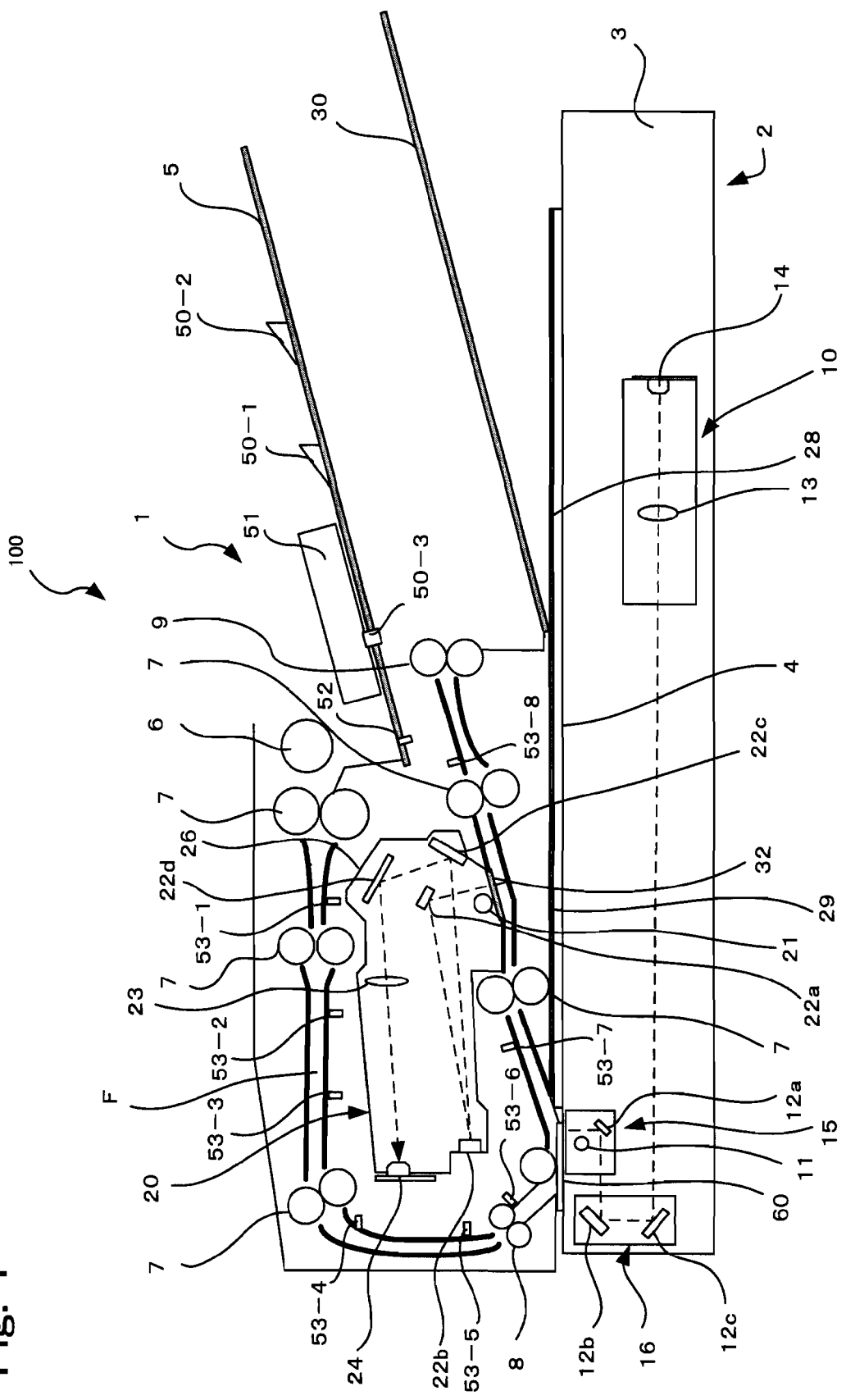
FIG. 1 is a configurational view showing one embodiment of a document reading apparatus according to the present invention.

As shown in FIG. 1, a document reading apparatus 100 according to the present invention includes: an automatic document feeder (which will be referred to hereinbelow as "ADF") 1 for automatically conveying documents along a document feed path F; a first image reader 10 for reading the image on the obverse side of a document being conveyed; and a second image reader 20 for reading the image on the underside of a document being conveyed.

First image reader 10 is an image reading device of a reduction optical system comprised of a light source 11, first to third mirrors 12a, 12b and 12c, a lens 13 and a CCD (image sensor) 14, whereas second image reader 20 is an image reading device of a reduction optical system comprised of a light source 21, first to fourth mirrors 22a, 22b, 22c and 22d, a lens 23 and CCD (image sensor) 24. The second image reader 20 is modularized as a single assembly of light source 21, first to fourth mirrors 22a, 22b, 22c and 22d, lens 23 and CCD 24.

Document reading apparatus 100 shown in FIG. 1 is mounted on the top of a copier (not shown) and is essentially comprised of ADF 1 including second image reader 20 and a main scanner 2 including first image reader 10.

ADF 1 and main scanner 2 are joined by a hinge (not shown) so that ADF 1 can be closed and opened rotationally on the hinge with respect to main scanner 2. Main scanner 2 is essentially comprised of a housing 3, a platen plate 4 of a transparent glass plate and first image reader 10 accommodated in housing 3.

First image reader 10 is essentially comprised of a light source unit 15 holding light source 11 and first mirror 12a and a mirror unit 16 holding second mirror 12b and third mirror 12c and lens 13 and CCD 14.

Main scanner 2 supports both the image reading in the flat bed mode for reading the document image of a document set on a platen (second document table) 4 and the image reading based on a document feed mode for reading the document image of a document being automatically conveyed by ADF 1.

When document image reading is performed in the flat bed mode, light source unit 15 and mirror unit 16 are moved to their home positions corresponding to the flat bed mode. Then, light source unit 15 illuminates the document with light while moving at a fixed speed in the sub scan direction (left-to-right direction with respect to the paper surface) so as to scan the image of the document. At the same time, mirror unit 16 moves in the sub scan direction at half the speed of the moving speed of light source unit 15.

Light emitted from light source unit 15 and reflected off the document is reflected by first mirror 12a provided for light source unit 15, then the light path is deflected by 180 degrees or to the opposite direction by second and third mirrors 12b and 12c of mirror unit 16. The light reflected off third mirror 12c is focused by lens 13 onto CCD 14, where the light is converted into electric image data.

On the other hand, when document image reading is performed in the document feed mode, light source unit 15 and mirror unit 16 are set at rest in the home position shown in FIG. 1 while light from light source 11 is irradiated on the document being conveyed over the top of the home position by ADF 1 so as to scan the image. The light reflected from the obverse side of the document is reflected by first mirror 12a in a similar manner as in the aforementioned flat bed mode, then the light path is deflected by 180 degrees or to the opposite direction by second and third mirrors 12b and 12c of mirror unit 16. The light is then focused by lens 13 onto CCD 14, where it is converted into electric image data.

As shown in FIG. 1, ADF 1 is essentially comprised of a drawing roller 6 for pulling the documents stacked on document feed tray (first document table) 5, sheet by sheet, into the interior of ADF 1, plural pairs of conveying rollers 7 for conveying the drawn document along document feed path F, a registration roller 8 for adjusting the paper feed timing and a document discharge roller 9 for discharging the handled document to a document output tray 30. ADF 1 also includes second image reader 20 given as a single unit, accommodated inside document feed path F that is laid out in an approximately U-shaped arc.

Second image reader 20 is comprised of first mirror 22a, second mirror 22b, third mirror 22c, fourth mirror 22d, lens 23 and CCD 24, these components being assembled as an integrated module accommodated in a unit housing 26. Here, in second image reader 20, light source 21, lens 23 and CCD 24 are the same as those of the first image reader.

As described above, second image reader 20 reads the image on the rear side of the document being conveyed along document feed path F when a duplex reading request is given from the user. Specifically, after the image on the obverse side of the document has been read by first image reader 10, the document is conveyed along document feed path 30 toward document output tray 30 and passes under light source 21 of second image reader. In this while, light source 21 of second image reader 20 irradiates the rear side of the document with light, and light reflected off the rear side of the document, having passed through a read window 32 of a transparent material such as glass or the like, is sequentially deflected by first to fourth mirrors 22a, 22b, 22c and 22d, and focused by lens 23 onto CCD 24, where the light is converted into electric image data.

The underside of ADF 1 is formed to serve as a pressing plate 28 for pressing the read document set on platen plate 4 of main scanner 2 from above. In this pressing plate 28, the portion opposing light source 21 of second image reader 20 is formed of an openable door element 29.

Further, document feed tray 5 is provided with a document sensor 52 for detecting the presence of a document and document length sensors 50-1 and 50-2 for detecting the document length along the document feed direction. Document feed tray 5 also includes a document guide 51 for limiting the side edges of documents. A volume 50-3 is coupled to this document guide so that the volume rotates to vary its resistance as the document guide is moved. This resistance is read through an A/D terminal by an after mentioned controller 101 shown in FIG. 6, so as to be able to detect the width of the set documents. In this way, the size of the documents set on document feed tray 5 can be detected by means of these document length sensors and the document guide.

Arranged along the feed path for conveying the document under reading are optical sensors 53-1, 53-2, 53-3, 53-4, 53-5, 53-6, 53-7 and 58-8 for detecting the position of the document being conveyed. These sensors also enable detection of the speed of the document being conveyed, based on their detection timing of the document.

Figure 2:
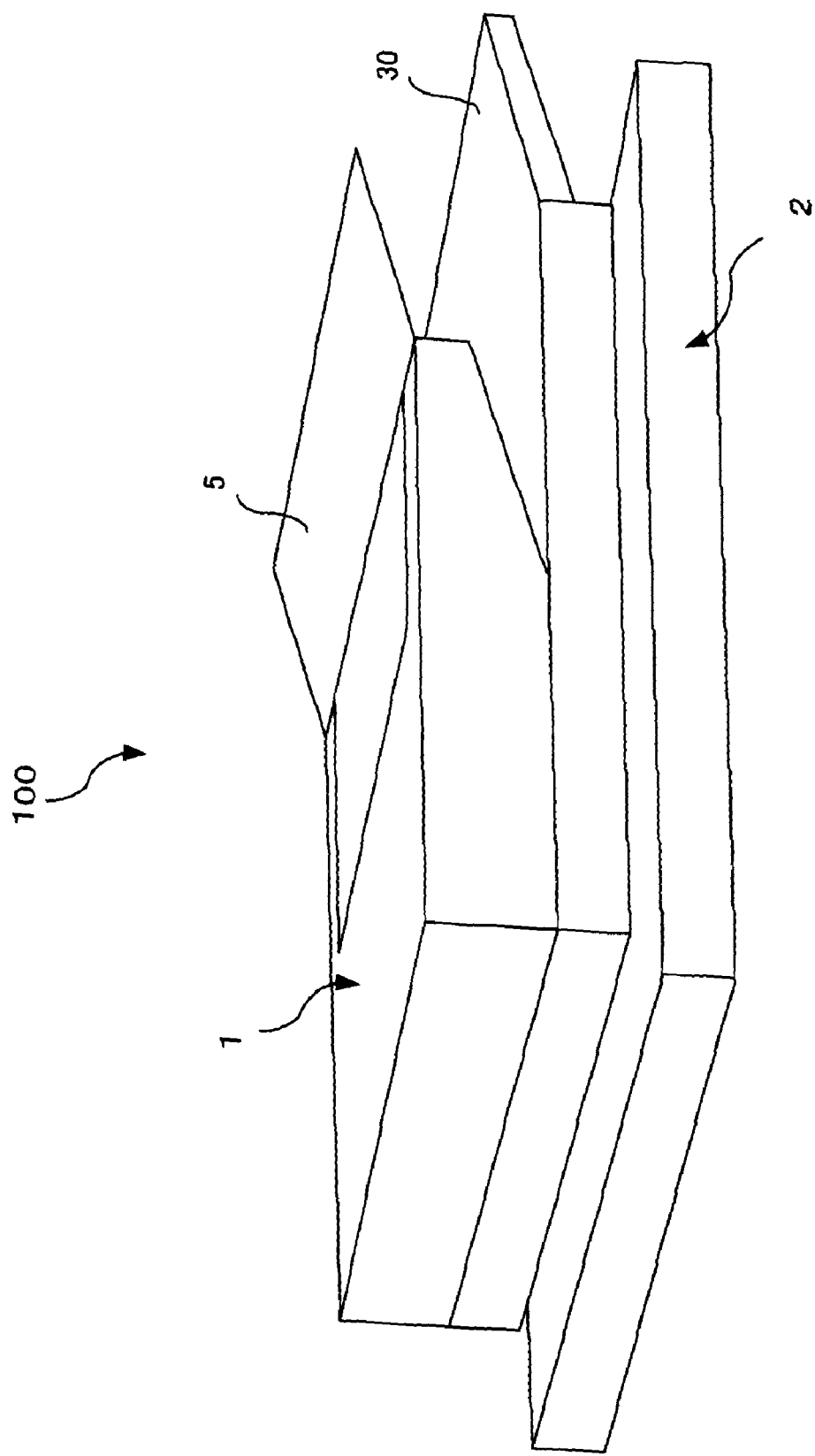
FIG. 2 is a perspective view showing a document reading apparatus with its automatic document feeder set closed.
Figure 3:
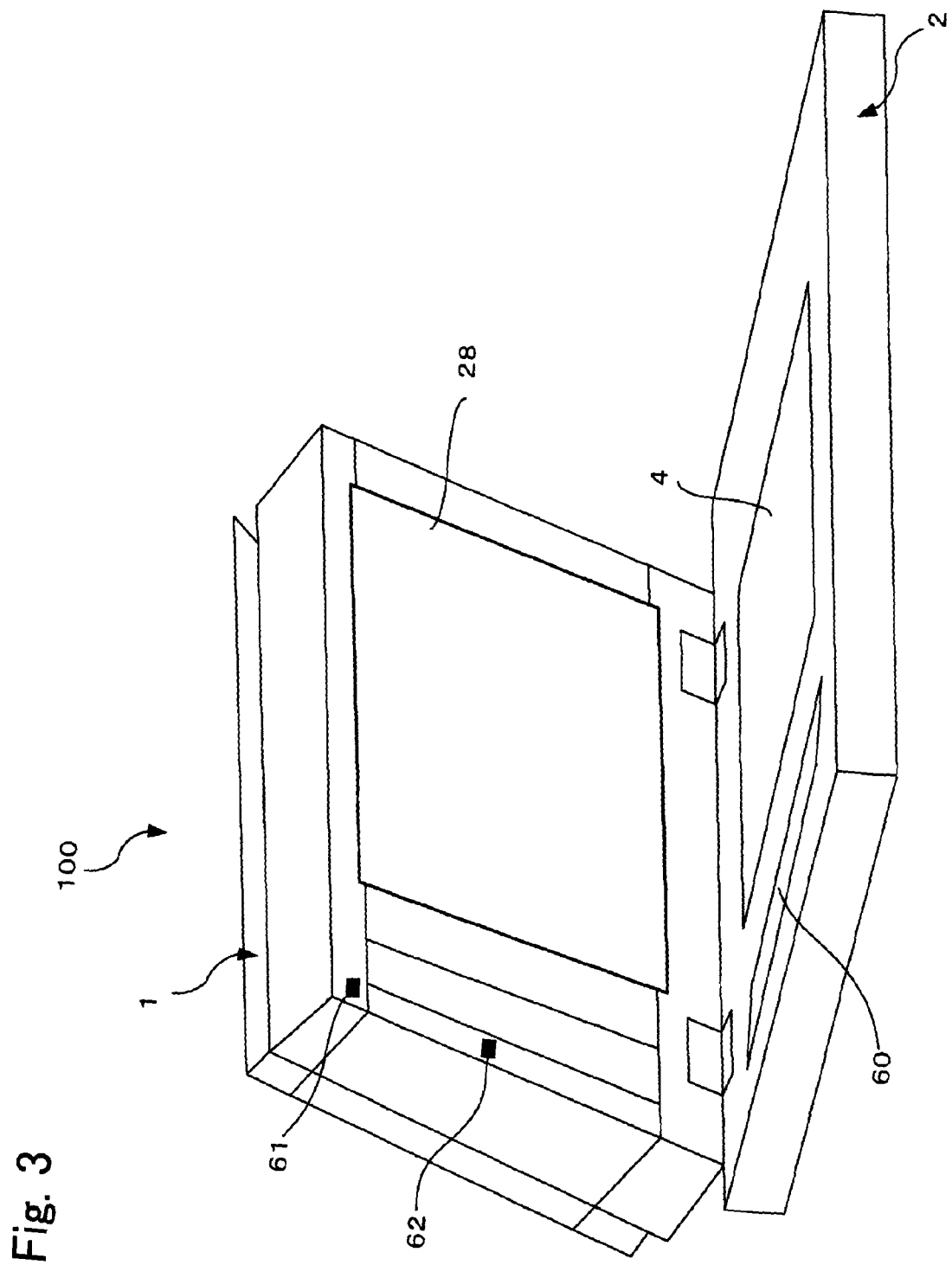
FIG. 3 is a perspective view showing a document reading apparatus with its automatic document feeder set open.

FIG. 2 is a perspective view showing document reading apparatus 100 shown in FIG. 1. FIG. 3 is a drawing showing the document reading apparatus with its automatic document feeder 1 set open. Platen plate 4 for placement of a read document is arranged on the top surface of main scanner 2. Pressing plate 28 for pressing the document set on platen 4 is provided for ADF 1 that is joined to main scanner 2 by hinges.

Further, a small platen plate 60 for reading the image of a document as it is automatically conveyed by the ADF is disposed adjacent to platen 4 on the aforementioned hinge side. The document that is moved by ADF 1 over small platen plate 60 is read by first image reader 10. A pair of document detecting sensors 61 and 62 for detecting the presence of a document over small platen plate 60 are provided at positions opposing small platen plate 60 on the ADF unit side.

Figure 4:
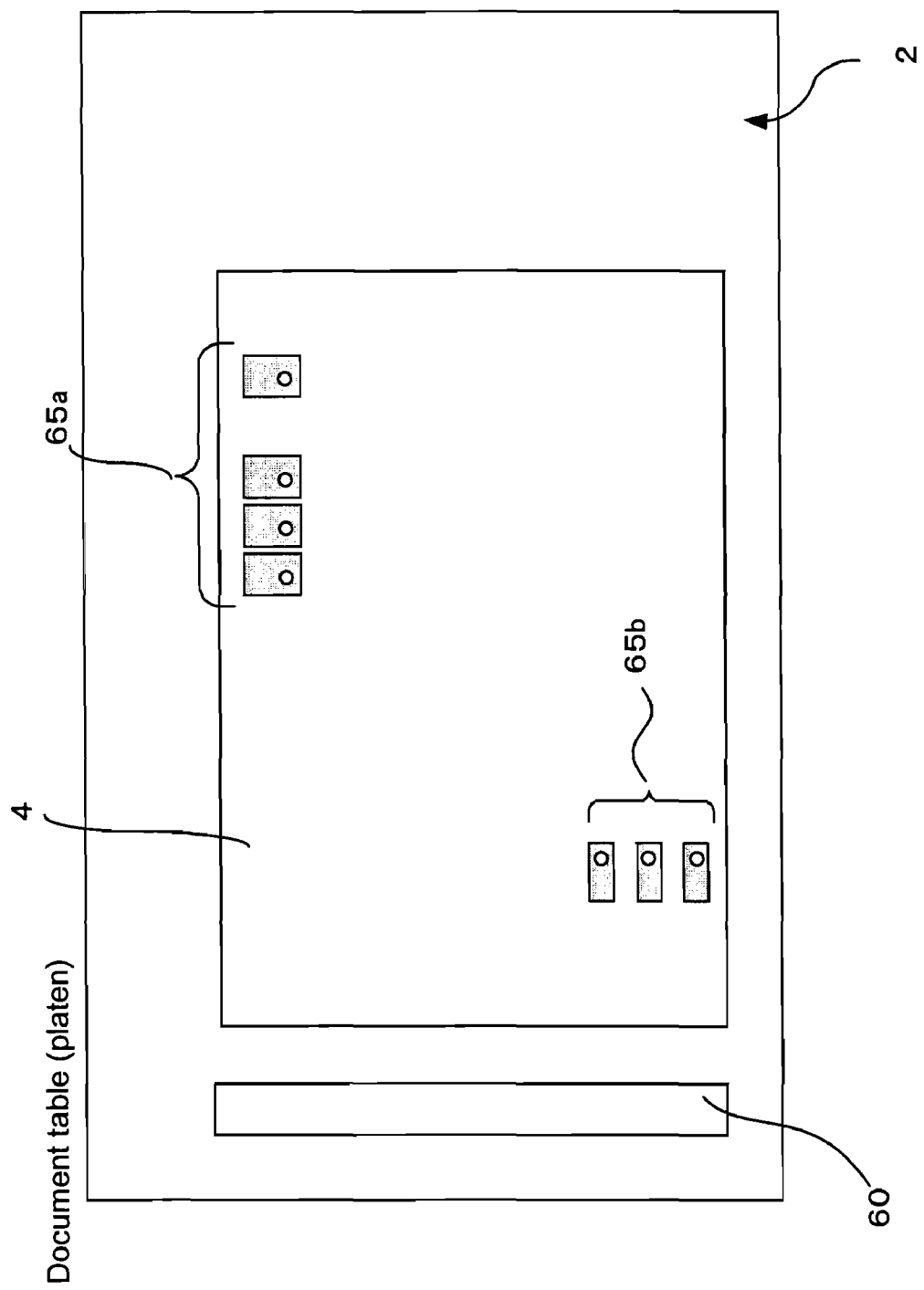
FIG. 4 is a top view of a main scanner.

FIG. 4 is a view showing main scanner 2 from the top. Grouped sensors 65a and 65b of reflective type sensors are arranged under platen plate 4 so as to be able to sense the document size of a standardized size by detecting which sensors are turned "ON" by reception of the reflected light from the document set on platen plate 4.

Figure 5:
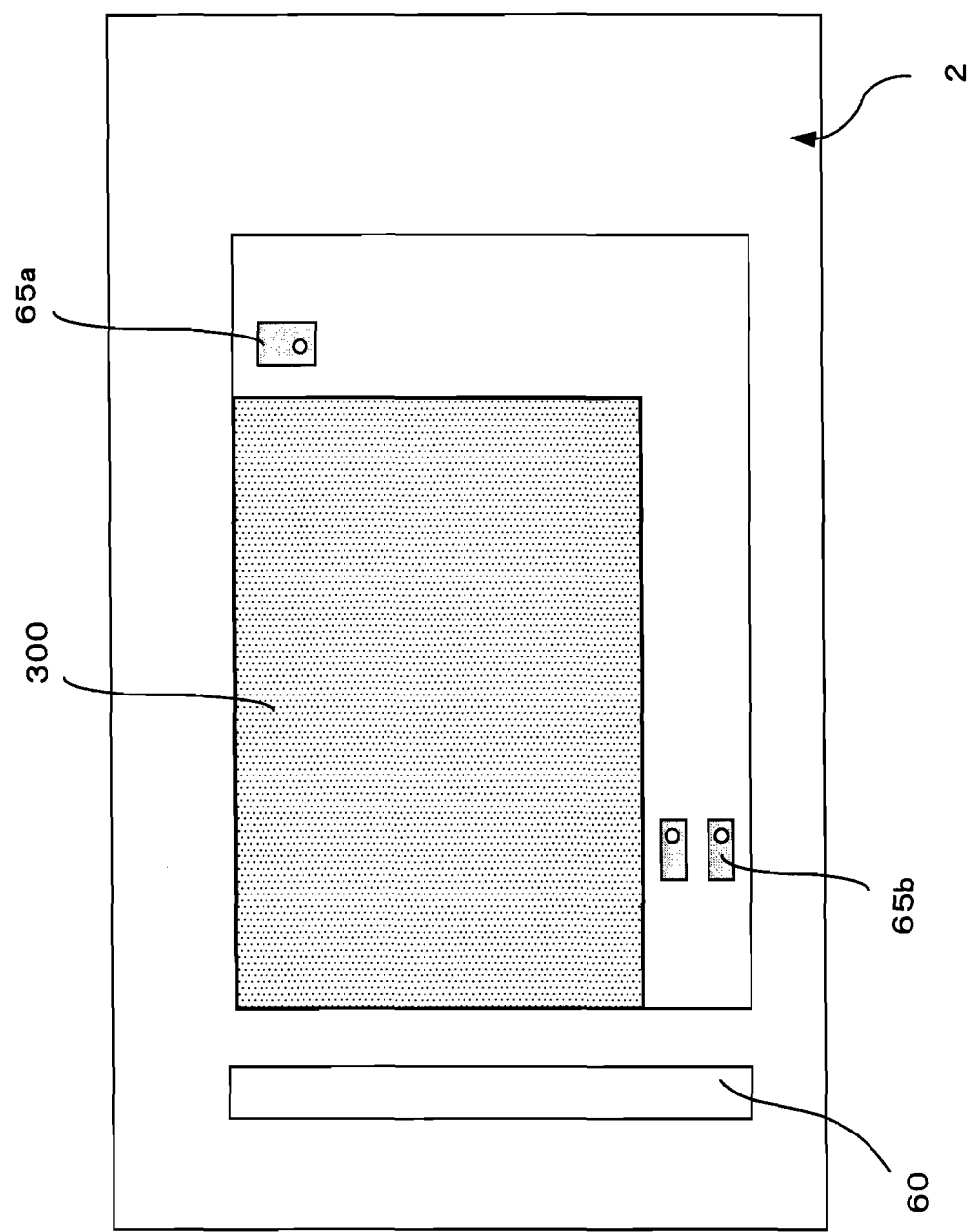
FIG. 5 is a view showing a document being set on the platen plate in FIG. 4.

FIG. 5 shows a case where a document is set on platen plate 4 in the drawing shown in FIG. 4. Since grouped sensors 65a and 65b are partially shaded by the set document, the size of the document of a standardized size set on platen plate 4 is detected. While document size detection is performed when ADF 1 is open, the document size detection result is given to the after mentioned controller 101 as soon as ADF 1 is closed, so that the document size of the document set on platen plate 4 is determined.

Figure 6:
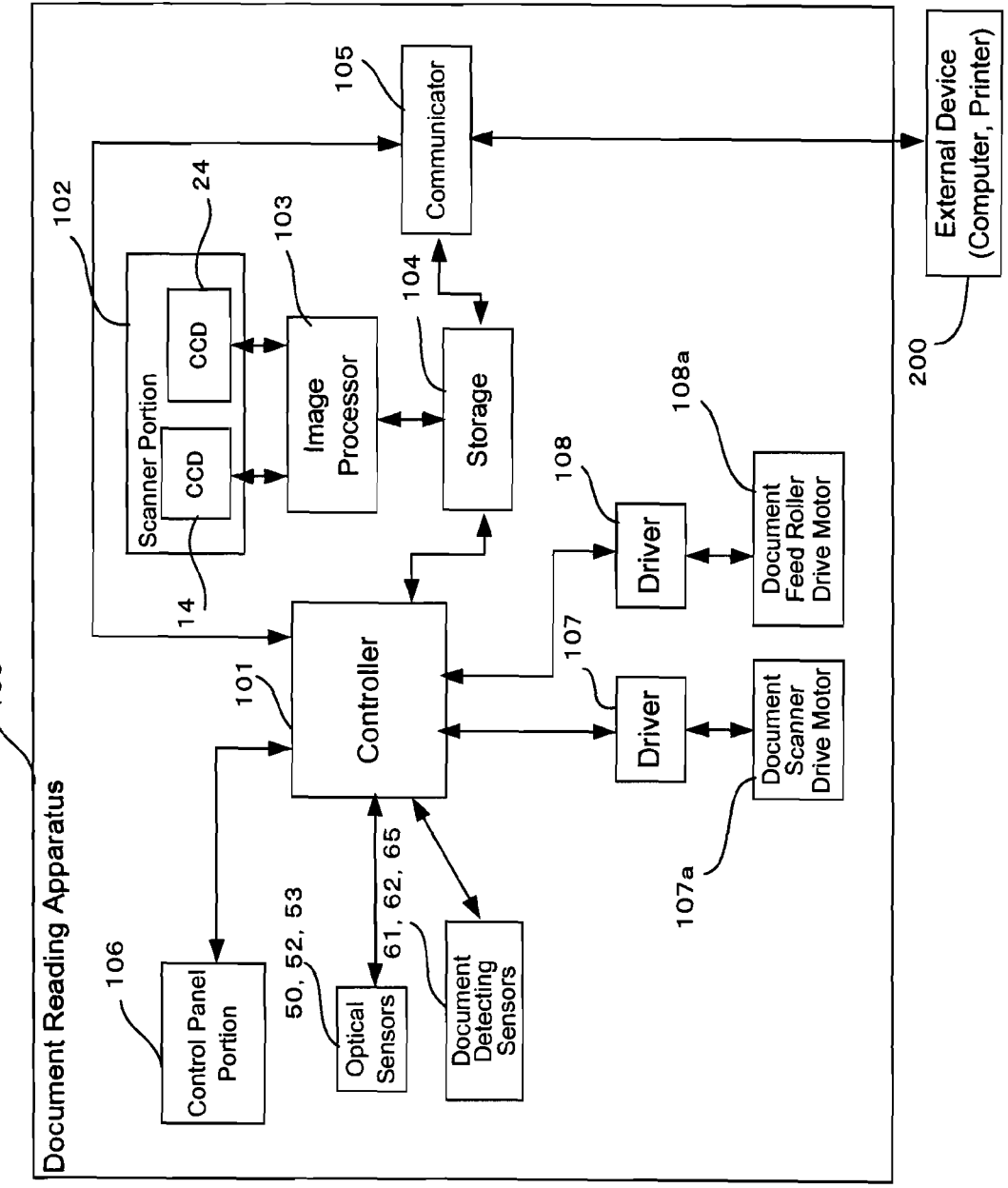
FIG. 6 is a block diagram schematically showing the main part of the electric components of a document reading apparatus of the present embodiment.

FIG. 6 is a block diagram schematically showing the main part of the electric components of document reading apparatus 100 of the present embodiment.

Document reading apparatus 100 of the present embodiment is essentially composed of controller 101, a scanner portion 102, an image processor 103, a storage 104, a communicator 105, a control panel portion 106, a driver 107 for driving and controlling a document scanner drive motor 107a, and a driver 108 for driving and controlling a document feed roller drive motor 108a. Optical sensors 50, 52 and 53 provided for ADF 1 and document detecting sensors 61, 62 and 65 provided for platen 4 send out the detection results to controller 101.

Controller 101 is the part for managing the operation control of the entire apparatus, and is constructed of a CPU, ROM, RAM and others, though not illustrated.

Scanner portion 102 constitutes the optical scanning systems for first and second image readers 10 and 20 shown in FIG. 1. Though in the above description, CCDs 14 and 24 in first and second image readers 10 and 20 employ optical reduction type CCDs (Charge Coupled Devices), they may also use a full-sized optical system, namely, CIS (Contact Image Sensor).

Image processor 103 converts the optical data read through first image reader 10 or second image reader 20 into electric image data page by page.

Storage 104 is configured of, for example, RAM, EEPROM, hard disk, and/or MO etc., and stores data under control, to be controlled by controller 101 and the various contents of input instructions. Storage 104 includes areas that function as the document image storage for storing document images read by scanner 102 and as the documentation storage for storing documentation of converted codes of character strings.

Communicator 105 is a communicating portion for performing two-way communications with a connected external device 200 such as a computer, printer, etc., and transfers the image processed data by image processor 103 to external device 200. The communicator also includes a memory for expanding the data transmitted from external device 200 into the data that can be handled by the subject apparatus.

Figure 7:
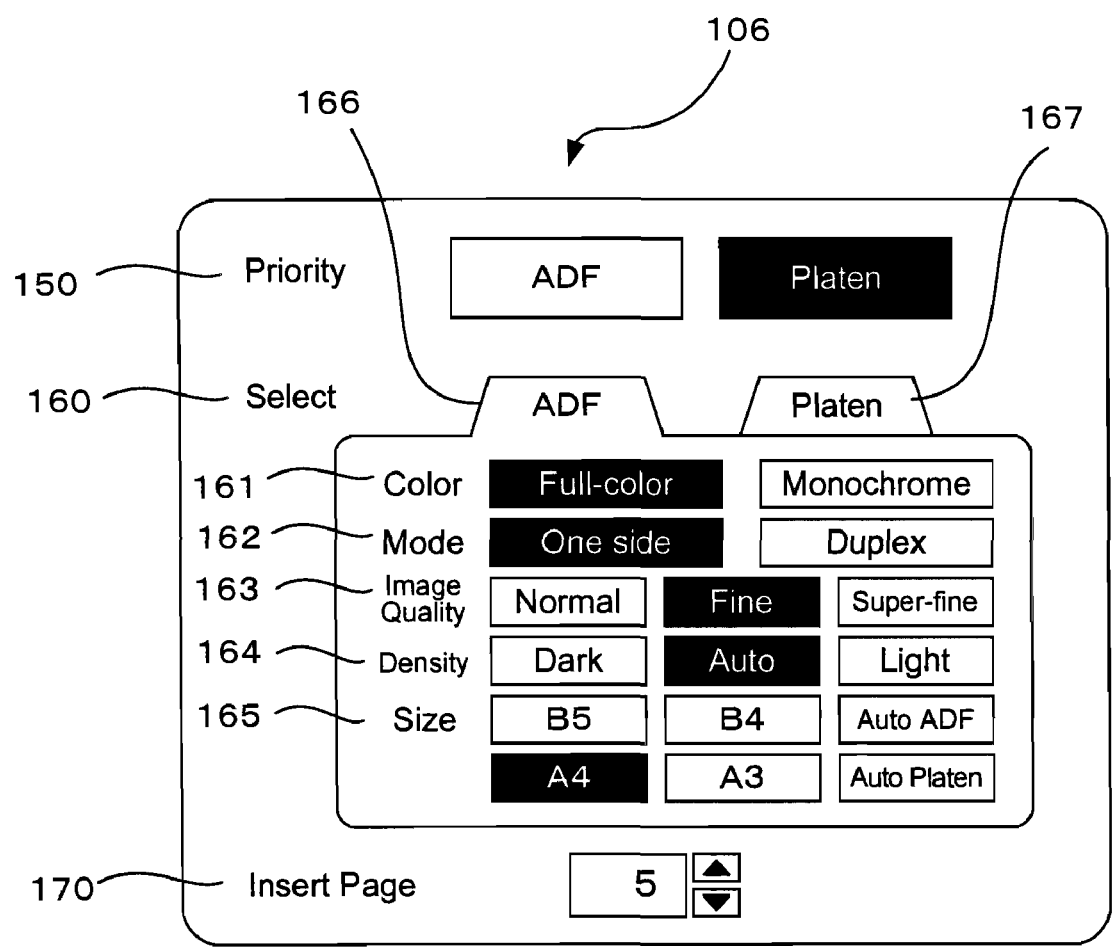
FIG. 7 is a schematic view showing a control panel portion.

FIG. 7 shows control panel portion 106. Control panel portion 106 is arranged in front of document reading apparatus 100 shown in FIG. 1. Specifically, the control panel portion is disposed on the top surface of the area where main scanner 2 is extended frontward beyond ADF 1. Control panel portion 106 includes keys for selecting the operational mode at the time of document reading (priority select key 150 for selecting whether to read documents from document feed tray 5 or read a document on platen plate 4 and insert page select key 170 for designating which page in the documents of ADF 1 the document on platen plate 4 is inserted into and the like), keys for selecting reading conditions (color select key 161 for designating whether to read in color or monochrome mode, mode select key 162 for designating whether to read in one-sided or duplex mode, image quality select key 163 for designating the degree of image quality for image reading, density select key 164 for designating whether to increase or decrease the density in reading and size select key 165 for designating the size at the time of recording) and the like.

Document scanner drive motor 107a is the motor for moving light source unit 15 and mirror unit 16 at appropriate speeds in the sub scan direction when the image of a document is read in the flat bed mode, and is driven and controlled as appropriate by driver 107 following the control from controller 101.

Document feed roller drive motor 108a is the motor for driving diverse rollers arranged along document feed path F such as drawing roller 6, conveying rollers 7, registration roller 8, document discharge roller 9 and the like, and is driven and controlled as appropriate by driver 108 following the control from controller 101.

Figure 8:
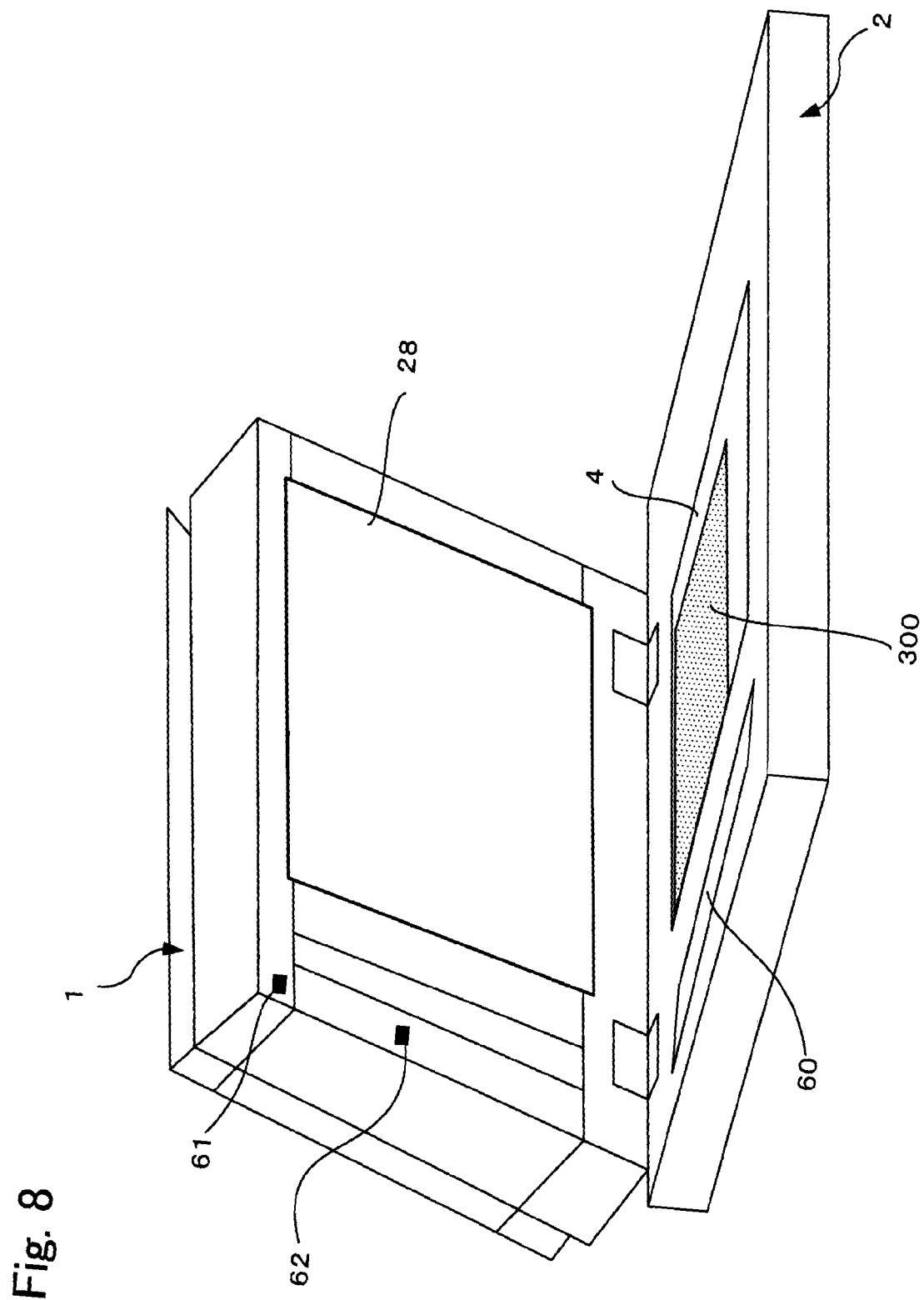
FIG. 8 is a view showing a case where a read document is set at the predetermined position on the platen plate.
Figure 9:
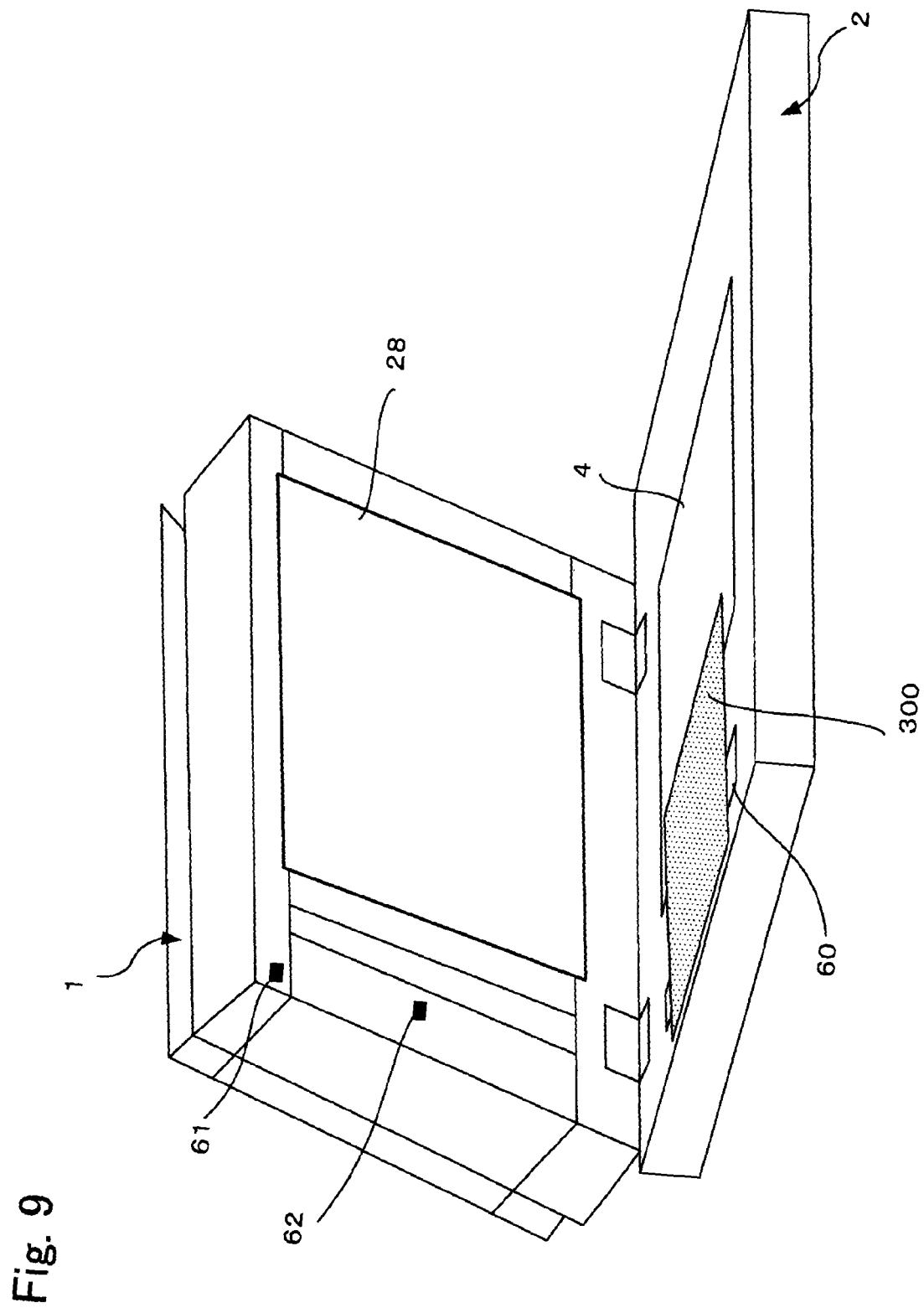
FIG. 9 is a view showing a case where a read document is set off the predetermined position on the platen plate.

FIGS. 8 and 9 are drawings showing the positional relationships between platen plate 4 and a read document. Each illustration shows a state where ADF 1 is set open in order to clear the positional relationship between the platen plate and the document to be read.

Since, in FIG. 8, a document 300 is set inside the platen plate 4 area, if another document is read in the document feed mode by ADF 1, the moving document is read over and through small platen plate 60 and conveyed along the document feed path, passing over the former document set on platen plate 4. Accordingly, even if a document is left on platen plate 4, it is possible to read the images of documents which are being automatically conveyed by the ADF.

On the other hand, FIG. 9 shows a state where a document is set extending beyond the platen plate 4 area and covering small platen plate 60 for document feed mode. In this state, it is not only impossible to perform document reading through small platen plate 60 but also there is a fear that the document being conveyed by the ADF becomes jammed and damaged since small platen plate 60 also serves as the document feed path in the document feed mode.

To deal with such a situation, document detecting sensors 61 and 62 for detecting the presence of a document on small platen plate 60 are provided at the positions opposing small platen plate 60 for document feed mode, on the ADF unit side, so as to prohibit feed of a document by ADF 1 and give a warning that the user should remove the document.

Figure 10:
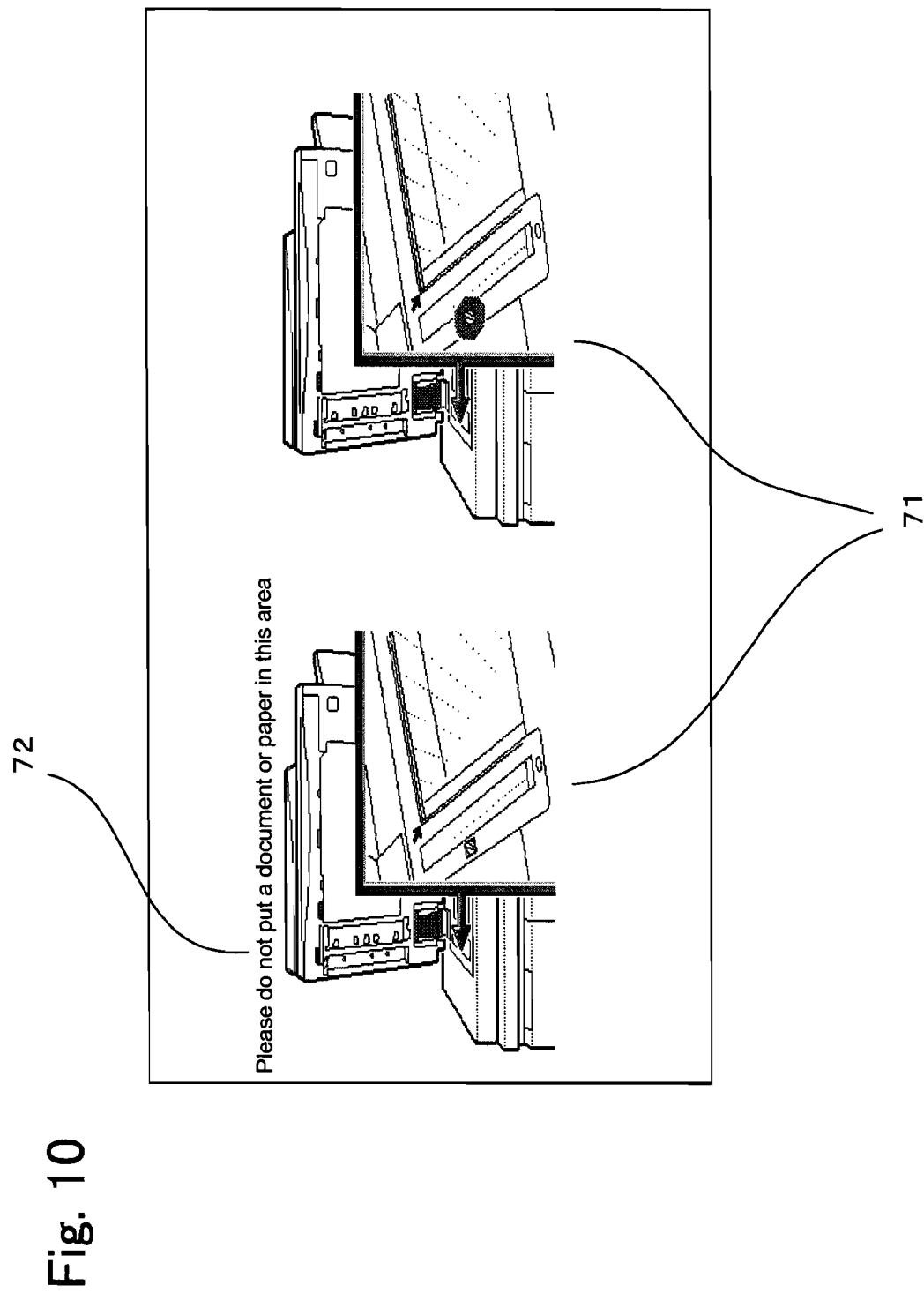
FIG. 10 is a view showing a case where a warning is displayed on the display of a control panel portion.

FIG. 10 shows an example of giving a warning. Indication of an image 71 with a text 72 on the display of control panel portion 106 makes it possible to give warning to the user.

Figure 11:
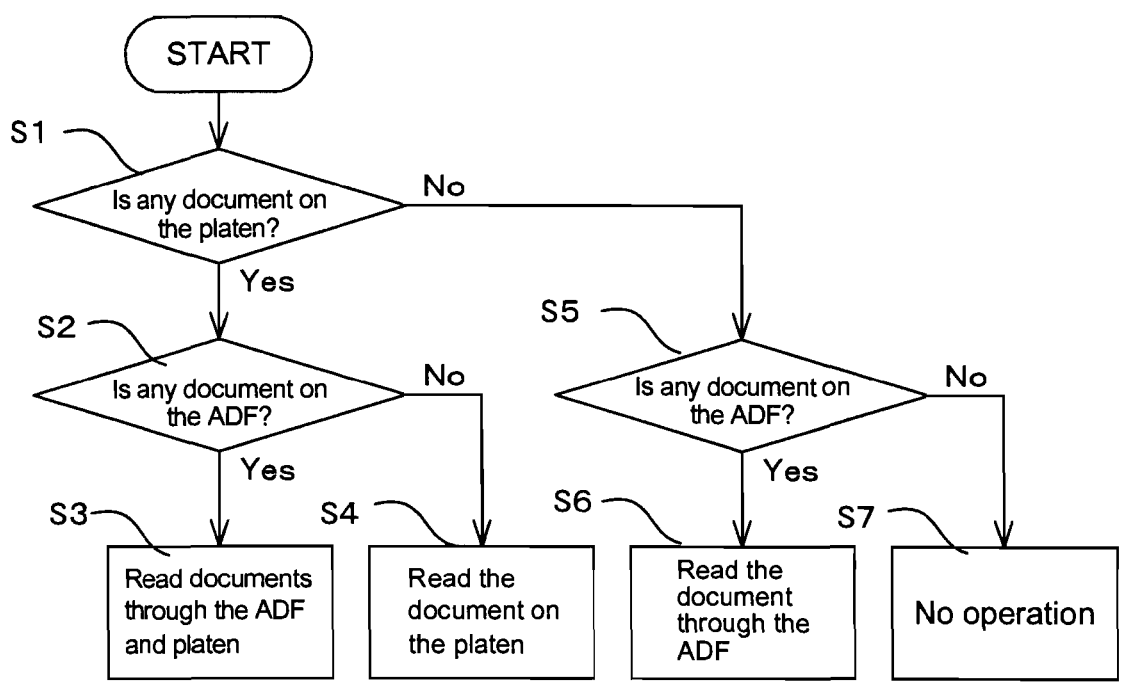
FIG. 11 is a flow chart for illustrating how documents are read when a document(s) is set on a document feed tray or a platen plate.

The case of the present invention is applied to the state where, with no document located over small platen plate 60 for document feed mode, some documents are set on document feed tray 5 and a document is set on platen plate 4, at the same time. FIG. 11 shows a flow in the document reading apparatus for detecting documents being set on both the document feed tray and the platen plate.

Here, it is detected first whether there is a document on platen plate 4 (Step S1). Then it is detected whether there are any documents on document feed tray 5 of ADF 1 (Steps S2 and S5). If a document(s) is set on one, but not both, of them (Step S5; Yes or Step S2; No), reading of the document set on platen plate 4 or the document from document feed tray 5 is started (Steps S4 and S6). When it is determined that a document(s) is set on both of them (Step S2; Yes), the documents on both of them are sequentially read as detailed later (Step S3). When neither platen plate 4 nor document feed tray 5 has any document set thereon, no operation will take place (Step S7).

Figure 12:
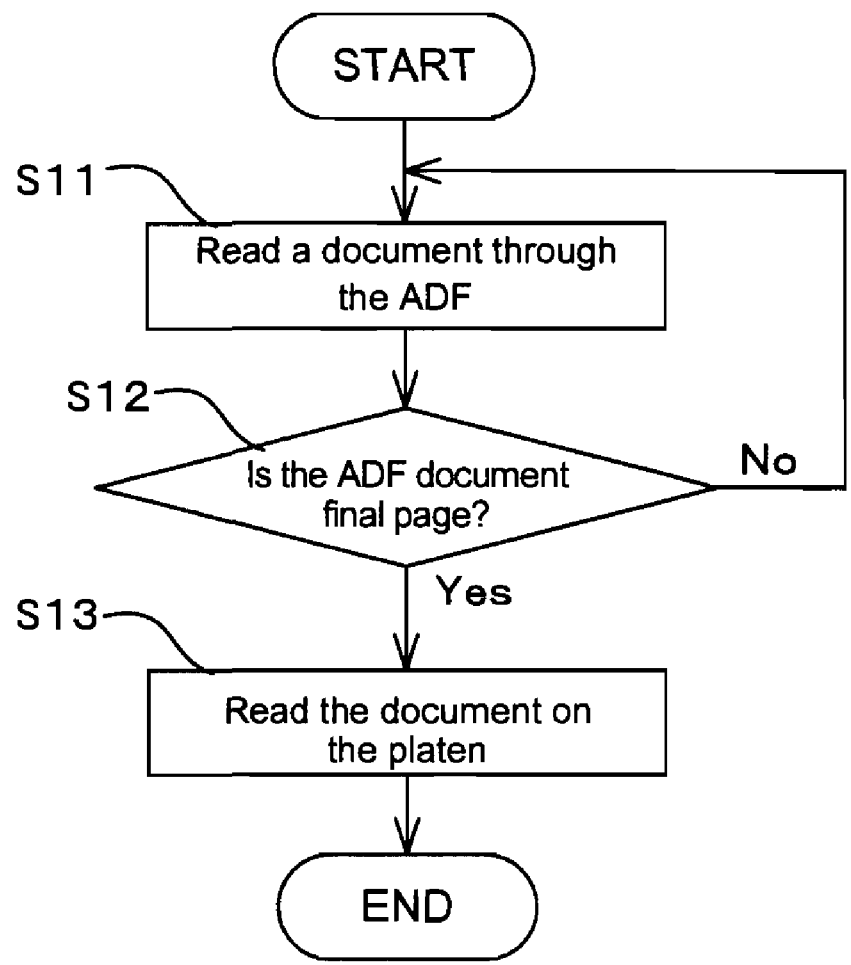
FIG. 12 is a flow chart showing an operation of reading documents when reading of the documents set on the document feed tray is given priority.

Specifically, when reading of the documents set on document feed tray 5 is given priority by user's setting through control panel portion 106, a document set on document feed tray 5 of ADF 1 is read first (Step S11) as shown in FIG. 12, then it is checked whether the document is the final page (Step S12). If it is confirmed that the document is the final page (Step S12; Yes), then the document set on platen plate 4 is read (Step S13).

Figure 13:
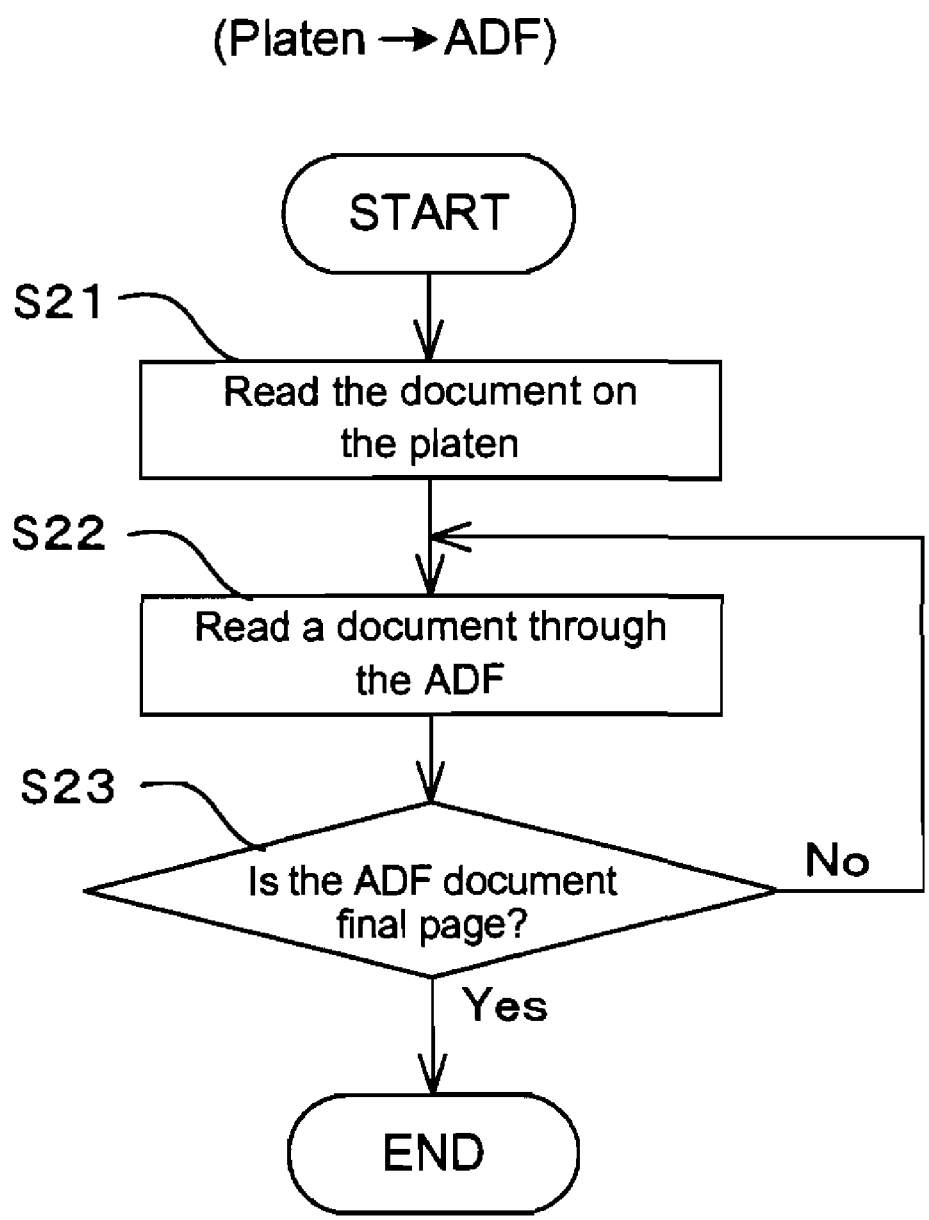
FIG. 13 is a flow chart showing an operation of reading documents when reading of a document set on the platen is given priority.

On the other hand, when reading of the document set on platen plate 4 is given priority by user's setting, the document set on platen plate 4 is read (Step S21) as shown in FIG. 13. Then, the document set on document feed tray 5 of ADF 1 is read (Step S22), and it is checked whether the document is the final page (Step S23). If the document is the final page, then the process is ended.

This configuration makes it possible to manage a copying task of documents as a single job even when documents that can be set on document feed tray 5 and a document that cannot be set on document feed tray 5 coexist, hence improve user convenience. Particularly when multiple sets of copies are needed, it is possible to prepare the multiple sets of copies without the necessity of manual sorting.

Which one of the documents set on document feed tray 5 and the document set on platen plate 4 is read first can be designated by user select through control panel portion 106, as stated above. Alternatively, the reading mode to be executed first may be designated beforehand. In this case, the designated setting is informed to the user through the display of control panel portion 106. When the user has modified the setting, the task is effected following the user instruction. When the user permits the initial setting or when a predetermined time has elapsed without any input, the task is effected based on the initial setting. In addition, as in control panel 106 shown in FIG. 7, the conditions for reading documents, including read color select, image quality, density, recording size and the like can be designated separately for each of the documents set on document feed tray 5 and the document set on platen plate 4, by selecting one of tabs 166 and 167 of "select" key 160. Herein, when, in setting the conditions for document feed tray 5 (ADF tab), the "Auto ADF" key is selected as to the recording size, the document size detected by document feed tray 5 is set as the reading and recording size of the document on document feed tray 5. On the other hand, when the "Auto Platen" key is selected, the document size detected by platen plate 4 can be designated as the reading and recording size of the document on document feed tray 5. Similarly, when, in setting the conditions for platen plate 4 (Platen tab), the "Auto Platen" key is selected as to the recording size, the document size detected by platen plate 4 is set as the recording size. When the "Auto ADF" key is selected, the document size detected by document feed tray 5 can be designated as the recording size. This configuration makes it possible to set up the recording size based on the document size of either of them in a simple manner.

It is also possible to read the document set on platen plate 4 and insert it into the predetermined page of the pages of the documents set on document feed tray 5. In this case, the insert page on control panel 106 in FIG. 7 should be designated.

Figure 14:
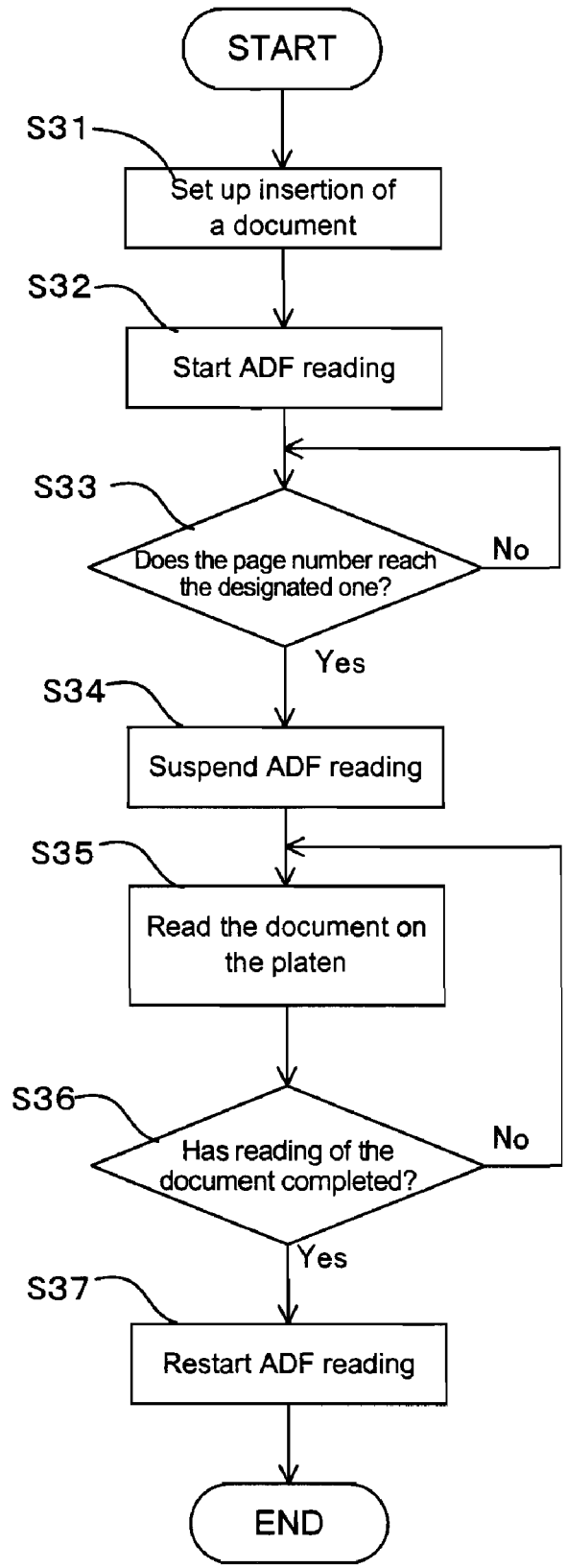
FIG. 14 is a flow chart showing a processing sequence of reading a document set on the platen and inserting it into a predetermined page of the copies of the documents set on the document feed tray.

FIG. 14 is a flow chart showing a processing sequence of reading a document set on platen plate 4 and inserting it into a predetermined page in the copies of the documents set on document feed tray 5.

The user designates the page number at which the document set on platen plate 4 is inserted through control panel portion 106 (Step S31). Then ADF 1 starts reading the documents set on document feed tray 5 (Step S32). When the page number reaches the designated one (Step S33), the apparatus stops reading the documents set on document feed tray 5 (Step S34), and starts reading the document set on platen plate 4 (Step S35). When reading of the document set on platen plate 4 is completed (Step S36), reading of the documents set on document feed tray 5 is restarted (Step S37). In this way, it is possible to insert the copy of the document set on platen plate 4 into the designated page of the copies of the documents set on document feed tray 5.

As another method, since recent multi-functional machines read images in a digital manner, it is possible to insert the document set on platen plate 4 into the designated page without any reduction of job efficiency. That is, as the page number at which the document set on platen plate 4 is inserted is designated, insertion of the page can be done by reading and storing the document set on platen 4 first, then reading and printing the documents set on document feed tray 5 and printing the stored image data of the document on platen 4 when the page number reaches the designated one.

Figure 15:
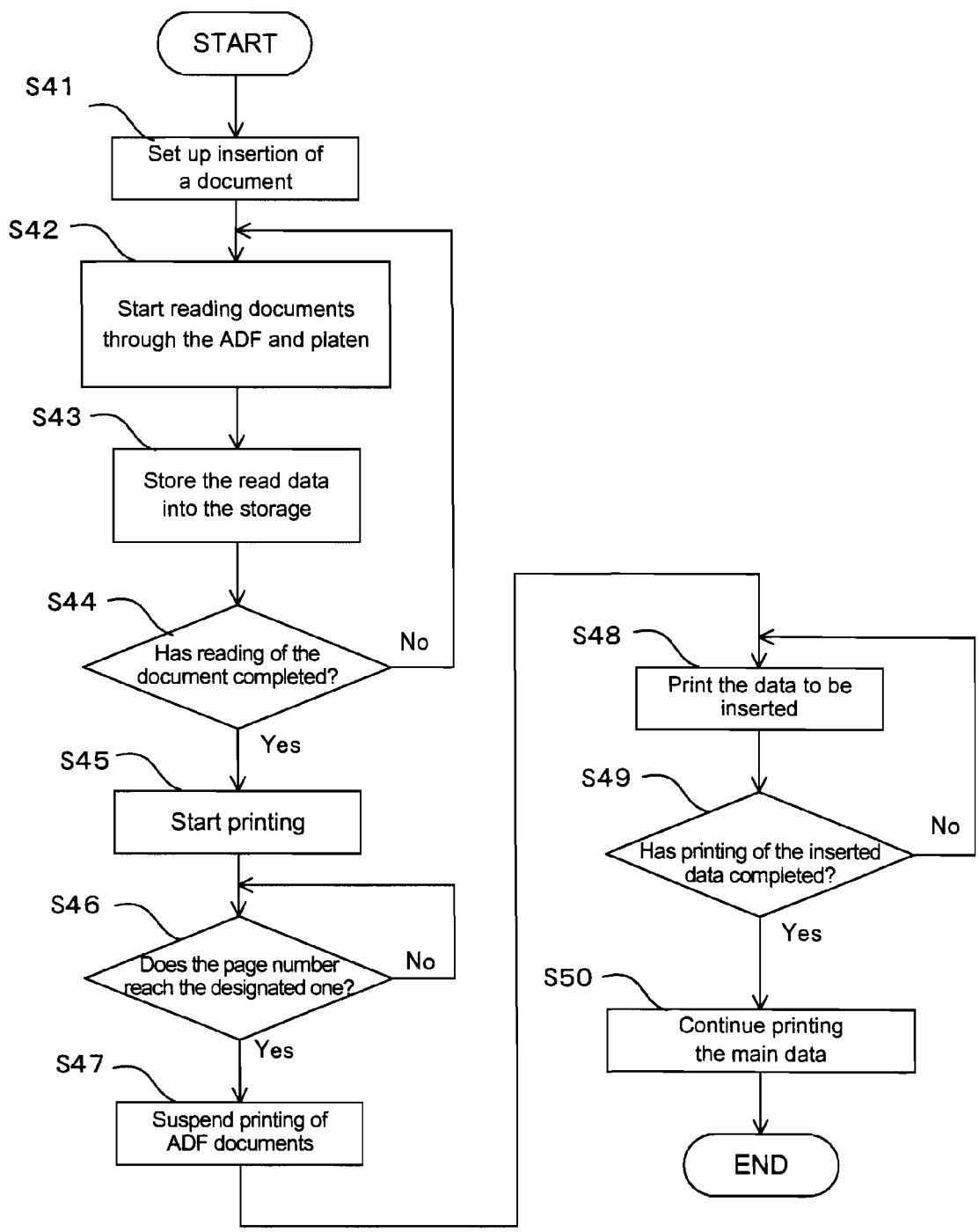
FIG. 15 is a flow chart showing a processing sequence of printing the copies of documents by inserting the page of a document set on the platen in a multifunctional machine; and, FIG. 16 is a flow chart showing a processing sequence of creating a single file by reading all the documents set on the platen plate and the document feed tray.

FIG. 15 is a flow chart showing a processing sequence of printing the copies of documents by inserting the page of a document set on platen 4 in a multifunctional machine.

When the user designates the page number at which the document set on platen plate 4 is inserted through control panel portion 106 (Step S41), then reading of the documents set on document feed tray 5 and reading of the document set on platen plate 4 are started (Step S42). Reading of these documents are performed in the order designated by the user. Controller 101 stores the read data of these into storage 104 (Step S43). When reading of the documents is completed (Step S44), printing is started (Step S45). The data of the documents set on document feed tray 5 has been printed up to the page to be inserted (Step S46), printing of the data of the documents set on document feed tray 5 is suspended (Step S47), and the data of the document set on platen plate 4 is printed (Step 48). When printing of the data of the document set on platen plate 4 is completed (Step S49), data printing of the documents set on document feed tray 5 is restarted (Step S50). In this way, it is possible to insert the copy of the document set on platen plate 4 into the designated page of the copies of the documents set on document feed tray 5.

Figure 16:
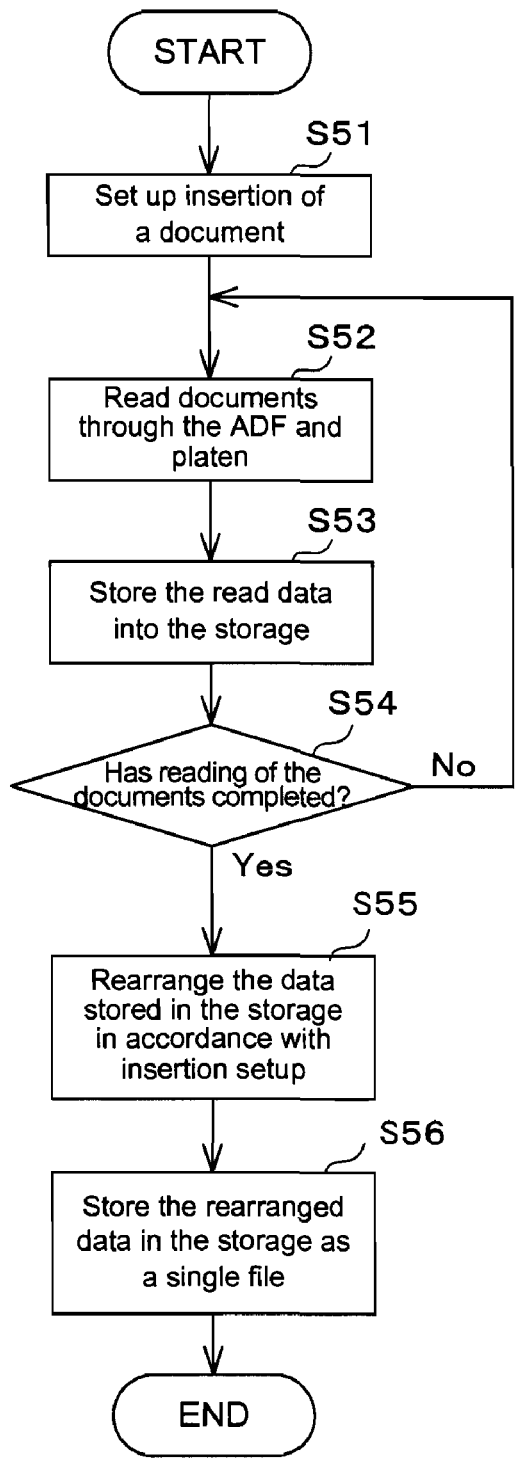

Next, FIG. 16 is a flow chart showing a processing sequence of creating a single file by reading both the documents set on platen plate 4 and document feed tray 5.

The flow up to the completion of reading documents (S51 to S54) is the same as the operation in FIG. 15. When reading is completed, controller 101 rearranges the data on individual documents stored in storage 104 based on the designation of the page number at which the document set on platen plate 4 is to be inserted (Step S55). Then the data on the rearranged documents is converted into a single file, which is stored into storage 104 (Step S56). When the stored file is printed, it is possible to insert the copy of the document set on platen plate 4 into the designated page of the copies of the documents set on document feed tray 5. It is also possible to transmit the stored file.

The present invention should not be limited to the above embodiment modes, and it goes without saying that various changes and modifications can be made therein without departing from the spirit and scope of the invention.

What is claimed is:

1. A document reading apparatus, comprising:
   an automatic document feeder for automatically conveying at least one document;
   a first document table for holding the at least one document to be delivered to the automatic document feeder;
   a first document detector for detecting the at least one document on the first document table;
   a second document table on which another document is set so as to be read;
   a second document detector for detecting the another document set on the second document table;
   a first image reader for reading the at least one and the another documents; and
   a second image reader arranged inside a document feed path of the automatic document feeder for reading an underside of the at least one document being conveyed by the automatic document feeder,
   wherein when existence of the at least one and the another documents on the first and second document tables is detected from both the first and second document detectors, the at least one and the another documents set on the first and second document tables are permitted to be read.

2. The document reading apparatus according to claim 1, wherein when the fact that the another document is set extending beyond the second document table is detected by the second document detector, the automatic document feeder is prohibited from operating.

3. The document reading apparatus according to claim 1, wherein which of the at least one and the another documents set on the first and second document tables is read first is selectable.

4. The document reading apparatus according to claim 1, wherein reading of the another document on the second document table is started after completion of reading by the automatic document feeder.

5. The document reading apparatus according to claim 1, wherein after reading a designated number of pages through the automatic document feeder, the another document on the second document table is read, then after completion of this reading, reading of the at least one document through the automatic document feeder is restarted.

6. The document reading apparatus according to claim 1, wherein reading of the at least one document through the automatic document feeder is started after completion of reading of the another document on the second document table.

7. The document reading apparatus according to claim 1, wherein the image read from the another document on the second document table can be inserted in a designated page of the images that have been read through the automatic document feeder.

8. The document reading apparatus according to claim 1, wherein when the at least one and the another documents exist on both the first and second document tables, the at least one and the another documents are read through both the two document tables so as to create a single file of data from the read plural sets of document image data.

9. The document reading apparatus according to claim 1, wherein the conditions for reading the at least one and the another documents in the first and second document tables can be designated separately.

10. The document reading apparatus according to claim 9, wherein the reading conditions include at least one of color/monochrome mode, one-side/duplex mode, resolution and enlargement/reduction.

11. The document reading apparatus according to claim 1, wherein the first document detector and the second document detector are used to detect the sizes of the at least one and the another documents set on the first and second document tables.

12. An image forming apparatus including the document reading apparatus according to claim 1.

* * * * *